(12) United States Patent
Chen (10) Patent No.: US 12,473,895 B2
(45) Date of Patent: Nov. 18, 2025

(54) SEESAW-TYPE HYDROELECTRIC POWER GENERATION DEVICE

(71) Applicant: Shih-Hsiung Chen, Tainan (TW)

(72) Inventor: Shih-Hsiung Chen, Tainan (TW)

( * ) Notice: Subject to any disclaimer, the term of this patent is extended or adjusted under 35 U.S.C. 154(b) by 0 days.

(21) Appl. No.: 18/519,375

(22) Filed: Nov. 27, 2023

(65) Prior Publication Data

US 2024/0200540 A1    Jun. 20, 2024

(30) Foreign Application Priority Data

Dec. 14, 2022   (TW) .................................. 111147962

(51) Int. Cl.
*F03G 3/00*   (2006.01)
*F03G 7/00*   (2006.01)
*F03G 7/10*   (2006.01)

(52) U.S. Cl.
CPC ............. *F03G 3/097* (2021.08); *F03G 7/027* (2021.08); *F03G 7/10* (2013.01); *F03G 7/115* (2021.08);
(Continued)

(58) Field of Classification Search
CPC . F03G 3/097; F03G 7/027; F03G 7/10; F03G 7/115; F03B 17/04; F05B 2210/11;
(Continued)

(56) References Cited

U.S. PATENT DOCUMENTS 4,207,739 A * 6/1980 Scarpi .................. F03B 13/20
60/497
5,174,760 A * 12/1992 Gray .................... G01M 17/02
40/406
(Continued)

FOREIGN PATENT DOCUMENTS

CN        106286165 A     1/2017
CN        111550350 A     8/2020
(Continued)

OTHER PUBLICATIONS

European Search Report dated May 22, 2024 of corresponding European Patent Application No. 23213749.7 (Year: 2024).*
(Continued)

*Primary Examiner* — Audrey B. Walter
(74) *Attorney, Agent, or Firm* — HDLS IPR SERVICES; Chun-Ming Shih (57) ABSTRACT

A seesaw-type hydroelectric power generation device is provided, including an elongated container (10), a hydroelectric turbine module (20), a pivot structure (30) below the elongated container (10), and a jacking structure (40) placed on both sides of the pivot structure (30). The elongated container (10) includes a first compartment (13) and a second compartment (14), and a water flow passage (15) connecting them. The hydroelectric turbine module (20) includes an impeller (22) and a power generator (21), the impeller (22) disposed in the water flow passage (15). When force is applied to the elongated container (10), it tilts around the pivot structure (30). The working fluid (WF) flows reciprocally through the water flow passage (15), driving the impeller (22) to rotate and thus generating electricity.

14 Claims, 7 Drawing Sheets

(52) U.S. Cl.
CPC ....... *F05B 2210/11* (2013.01); *F05B 2220/32* (2013.01); *F05B 2260/4021* (2013.01); *F05B 2270/502* (2013.01)

(58) Field of Classification Search
CPC .......... F05B 2220/32; F05B 2260/4021; F05B 2270/502; Y10S 415/916
USPC .................................................... 60/639, 640
See application file for complete search history.

(56) References Cited

U.S. PATENT DOCUMENTS

| | | | | |
|---|---|---|---|---|
| 5,706,595 A * | 1/1998 | Lin | .......................... | G09F 19/02 40/406 |
| 2015/0267675 A1* | 9/2015 | Kumano | .............. | F03B 17/065 290/54 |

FOREIGN PATENT DOCUMENTS

| | | | | |
|---|---|---|---|---|
| CN | 113137357 A | 7/2021 | | |
| FR | 2375463 A1 | 7/1978 | | |
| TW | 200846554 A | 12/2008 | | |
| TW | M642807 U | 6/2023 | | |
| WO | WO-2012125111 A1 * | 9/2012 | .............. | F03B 13/22 |
| WO | WO-2014089983 A1 * | 6/2014 | .............. | F03B 13/20 |

OTHER PUBLICATIONS

Search Report dated May 22, 2024 of the corresponding European patent application No. 23213749.7.

Office Action dated Oct. 24, 2024 of the corresponding Taiwan patent application No. 111147962.

* cited by examiner

SEESAW-TYPE HYDROELECTRIC POWER GENERATION DEVICE

BACKGROUND OF THE INVENTION

Technical Field

The present disclosure relates to a technology of a hydroelectric power generation device, in particular to a seesaw-type hydroelectric power generation device.

Description of Related Art

Due to the global warming and the limited reserves of petroleum, renewable energy sources with relatively lower environmental impacts, such as solar energy, wind power, hydropower, and ocean currents, have been vigorously developed. These natural resources offer inexhaustible means for generating electricity and have become a popular topic of research.

Although solar and wind energies can generate electricity, they are affected by weather conditions and cannot produce power steadily and continuously. Additionally, the thermoelectric conversion efficiency and photoelectric conversion efficiency of solar power have not been effectively improved, limiting the amount of electricity it can output. Furthermore, wind power generation faces challenges such as site restrictions, installation difficulties, and the high noise levels produced during operation, which are significant issues to be overcome.

In light of these challenges, the inventor has devoted efforts to research, in conjunction with theoretical application, to solve these problems, which has become the goal of this innovation.

SUMMARY OF THE INVENTION

An objective of the present disclosure is to provide a seesaw-type hydroelectric power generation device that is not constrained by weather or geographical limitations, thereby enabling the continuous and uninterrupted generation of electricity.

In order to achieve the above objective, the present disclosure provides a seesaw-type hydroelectric power generation device filled with a working fluid inside. The seesaw-type hydroelectric power generation device includes an elongated container including a chamber filled with the working fluid and a partition, the partition separating the chamber into a first compartment and a second compartment, wherein a water flow passage is located below the partition and communicates with the first compartment and the second compartment; a hydroelectric turbine module including an impeller and a power generator connected to the impeller, wherein the impeller is arranged in the water flow passage; a pivot structure disposed below the elongated container and arranged corresponding to a middle position of the elongated container; a jacking structure disposed on two sides of the pivot structure; wherein when a force is applied to the elongated container, the elongated container is tilted by pivoting around the pivot structure and alternately jacked through the jacking structure, the working fluid flows reciprocally in the water flow passage and drives the impeller to rotate to generate electricity by the power generator.

The disclosure further has the following advantages:

1. It may swing the elongated container with a relatively small force to produce a left and right seesaw motion, driving the impeller and power generator to rotate and generate electricity through the working fluid.

2. A portion of the electricity generated by the power generator is supplied to the lifting structure to drive the seesaw motion of the elongated container, while the other part of the electricity is used to supply external electrical needs.

3. The device of the present disclosure may be placed anywhere on land or set up in a water tank.

4. This device is an energy equipment that combines wave and hydropower concepts, unaffected by weather, and capable of generating electricity continuously 24 hours a day.

5. By adjusting the amplitude (or angle) and frequency of the seesaw motion with a speed controller, electricity may be generated according to actual demand.

6. With the setup of power storage devices, the electricity generated by the power generator may be stored for use at other times or for special needs, especially during off-grid periods.

7. The structure is simple, and it takes very little force to rotate the elongated container.

8. The main weight is borne entirely or mostly by the pivot structure, so rotating the elongated container does not require much force, even when the elongated container is biased to one side.

9. With the assistance of elastic force or buoyancy, it does not require much force to lift the heavier side.

10. Due to the setup of the lifting structure, an effort-saving effect is achieved.

DETAILED DESCRIPTION

The detailed description and technical content of the present disclosure are provided below with reference to the drawings. However, the accompanying drawings are only for reference and illustration and are not intended to limit the present disclosure.

Figure 1:
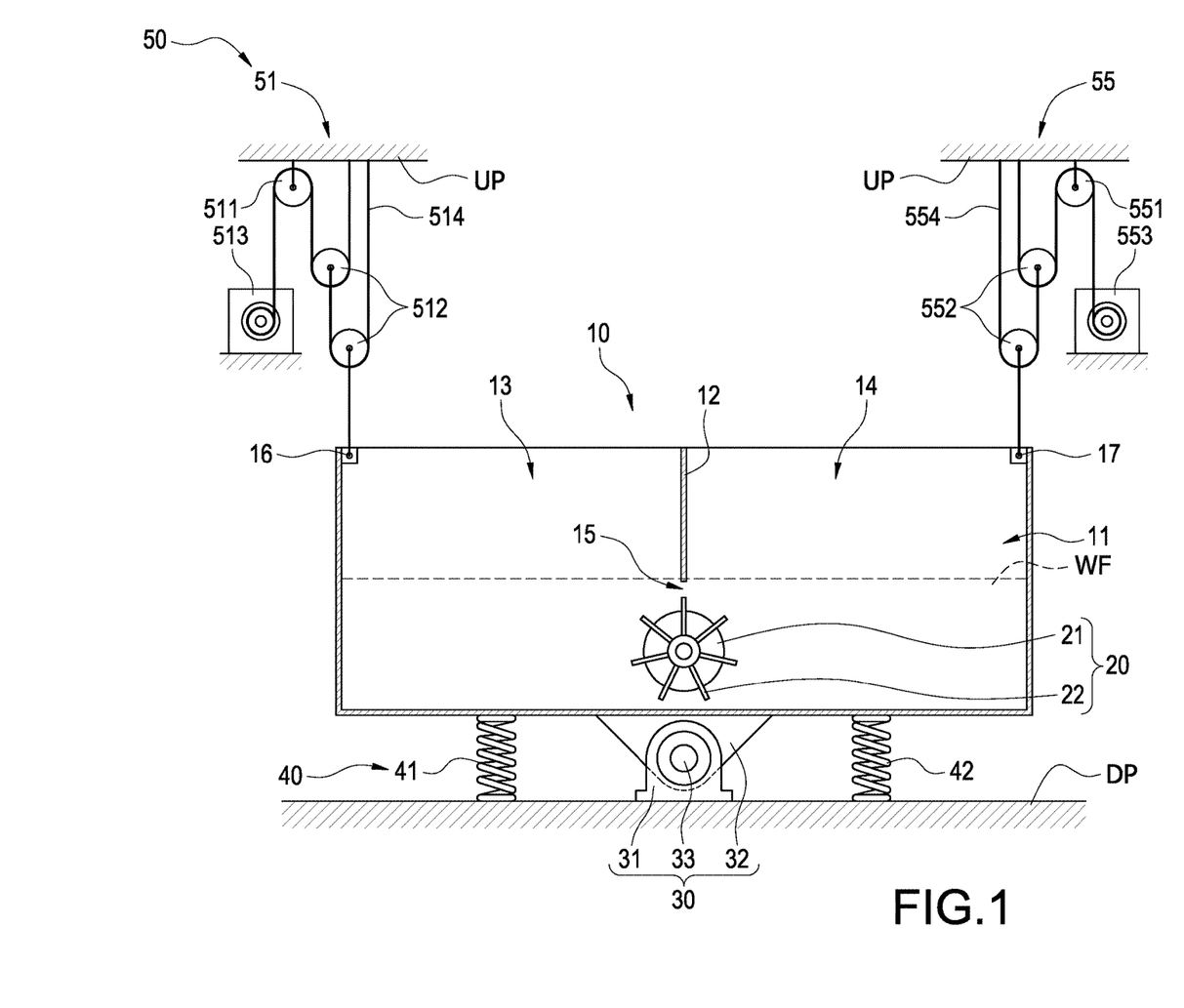
FIG. 1 is a cross-sectional assembly view illustrating a seesaw-type hydroelectric power generation device of the present disclosure.

Referring to FIG. 1, the present disclosure provides a seesaw-type hydroelectric power generation device, primarily including an elongated container 10, a hydroelectric turbine module 20, a pivot structure 30 and a jacking structure 40.

The elongated container 10 may have a rectangular, oval, circular, or other geometric cross-sectional shape, and includes a chamber 11 divided by a partition 12 into a first compartment 13 and a second compartment 14. Below the partition 12 is a water flow passage 15 connecting these compartments. The partition 12, located in the middle of the chamber 11, ensures equal volumes for the first compartment 13 and the second compartment 14. Additionally, at top corners of the elongated container 10, there are a first compartment tension point 16 and a second compartment tension point 17.

The hydroelectric turbine module 20 mainly includes a power generator 21 and an impeller 22 connected to the power generator 21. The impeller 22 is disposed in the water flow passage 15 and includes a plurality of turbine blades (Turbine) to drive the power generator 21 to generate electricity via rotation of the impeller 22.

The pivot structure 30 is disposed under the elongated container 10 and arranged in the middle of the elongated container 10, and is formed directly under the partition 12. The pivot structure 30 mainly includes a support base 31, an angle plate 32 and a bearing 33. The support base 31 is fixed to the lower platform DP, the angle plate 32 is fixed to a bottom surface of the elongated container 10, and the angle plate 32 is connected to the support base 31 through the bearing 33.

The jacking structure 40 of this embodiment consists of springs 41 and 42 which are respectively arranged on two sides of the pivot structure 30. In addition, the jacking structure 40 may also be a hydroelectric device, a pneumatic device, or other force-applying devices.

In one embodiment, the seesaw-type hydroelectric power generation device of the present disclosure also includes a lifting device 50 which is disposed over the elongated container 10 and connected to the elongated container 10. The lifting device 50 acts as a labor-saving structure, utilizing movable pulleys, so that a lifting force to lift the elongated container 10 is much less than a weight of a working fluid WF.

The lifting structure 50 mainly includes a first pulley assembly 51 and a second pulley assembly 55. The first pulley assembly 51 is arranged on an upper left side of the elongated container 10, and mainly includes a fixed pulley 511, two movable pulleys 512, a first electric motor 513, and a pull rope 514. The fixed pulley 511 is fixed to an upper platform UP, the first electric motor 513 is connected to the fixed pulley 511 and the movable pulleys 512 through the winding of the pull rope 514. One of the movable pulleys 512 is connected to the first compartment tension point 16 of the elongated container 10 to achieve labor-saving effect.

Similarly, the second pulley assembly 55 is arranged on an upper right side of the elongated container 10, and mainly includes a fixed pulley 551, two movable pulleys 552, a second electric motor 553, and a pull rope 554. The fixed pulley 551 is fixed to an upper platform UP. The second electric motor 553 is connected to the fixed pulley 551 and the movable pulleys 552 through the winding of the pull rope 554. One of the movable pulleys 552 is connected to the second compartment tension point 17 of the elongated container 10.

In addition, the number of the movable pulleys 512 and the number of the movable pulleys 552 are not limited to two as illustrated; there may be three or more to achieve better labor-saving effects.

Figure 2:
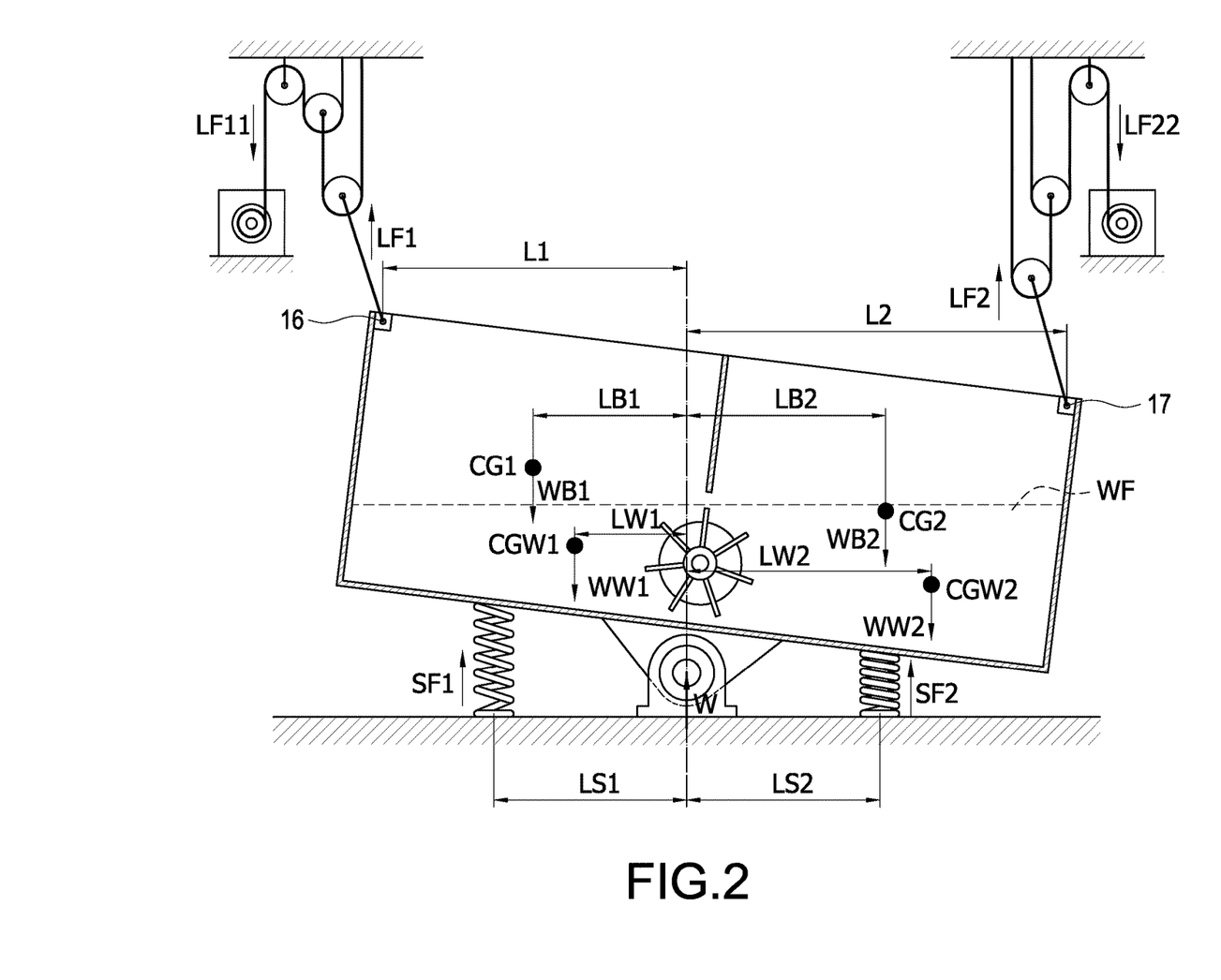
FIG. 2 is a force diagram of the seesaw-type hydroelectric power generation device of the present disclosure.

Refer to FIG. 2 for the following symbol explanations:

CG1: Left-side center of gravity of the container
CGW1: Left-side center of gravity of the working fluid
L1: Lever arm from the first compartment tension point to the pivot
LB1: Lever arm from the left-side center of gravity of the container to the pivot
LF1: Lifting force exerted by the first pulley assembly on the elongated container
LF11: Pulling force by the first electric motor
LS1: Lever arm from the left spring to the pivot
LW1: Lever arm from the left-side center of gravity of the working fluid to the pivot
SF1: Force exerted by the left spring
WB1: Weight of the left side of the container
WW1: Weight of the left side of the working fluid
CG2: Right-side center of gravity of the container
CGW2: Right-side center of gravity of the working fluid
L2: Lever arm from the second compartment tension point to the pivot
LB2: Lever arm from the right-side center of gravity of the container to the pivot
LF2: Lifting force exerted by the second pulley assembly on the elongated container
LF22: Pulling force by the second electric motor
LS2: Lever arm from the right spring to the pivot
LW2: Lever arm from the right-side center of gravity of the working fluid to the pivot
SF2: Force exerted by the right spring
WB2: Weight of the right side of the container
WW2: Weight of the right side of the working fluid
W: Supporting force
The List is as Follows

| | Force | Lever Arm | Torque | Direction |
|---|---|---|---|---|
| Left side of container | WB1 | LB1 | WB1 × LB1 | Counterclockwise |
| Left side of working fluid | WW1 | LW1 | WW1 × LW1 | Counterclockwise |
| Left spring | SF1 | LS1 | SF1 × LS1 | clockwise |
| Left lifting force | LF1 | L1 | LF1 × L1 | clockwise |

| | Force | Lever Arm | Torque | Direction |
|---|---|---|---|---|
| Right side of container | WB2 | LB2 | WB2 × LB2 | Clockwise |
| Right side of working fluid | WW2 | LW2 | WW2 × LW2 | Clockwise |
| Right spring | SF2 | LS2 | SF2 × LS2 | Counterclockwise |
| Right lifting force | LF2 | L2 | LF2 × L2 | Counterclockwise |

Overall torque (Torque, clockwise is positive, counterclockwise is negative) is calculated as $$T=(-WB1 \times LB1-WW1 \times LW1+SF1 \times LS1+LF1 \times L1)+ (WB2 \times LB2+WW2 \times LW2-SF2 \times LS2-LF2 \times L2).$$

If T>0, the tendency is to rotate clockwise; if T<0, the tendency is to rotate counterclockwise.

In the aforementioned parameters, WB1 and WB2 are fixed values, while WW1, WW2, SF1, SF2, LF1, and LF2 are variable values. In the illustrated drawings, when the working fluid WF tilts to the right side, it causes the right side of the working fluid WF to be heavier, and WW2>WW1, but the spring's lifting force SF2>SF1 tends to rotate counterclockwise. By appropriately selecting the specifications and dimensions of the springs, it is relatively easy to rotate the elongated container 10 in a counterclockwise direction. Thus, the force required by LF2 is reduced, making it easier to achieve counterclockwise rotation even though the overall weight of the working fluid WF is biased towards the right side. This results in the working fluid WF flowing into the first compartment 13. During this flow, the working fluid passes through the water flow passage 15, driving the impeller 22 to rotate and generate electricity through the power generator 21.

Figure 3:
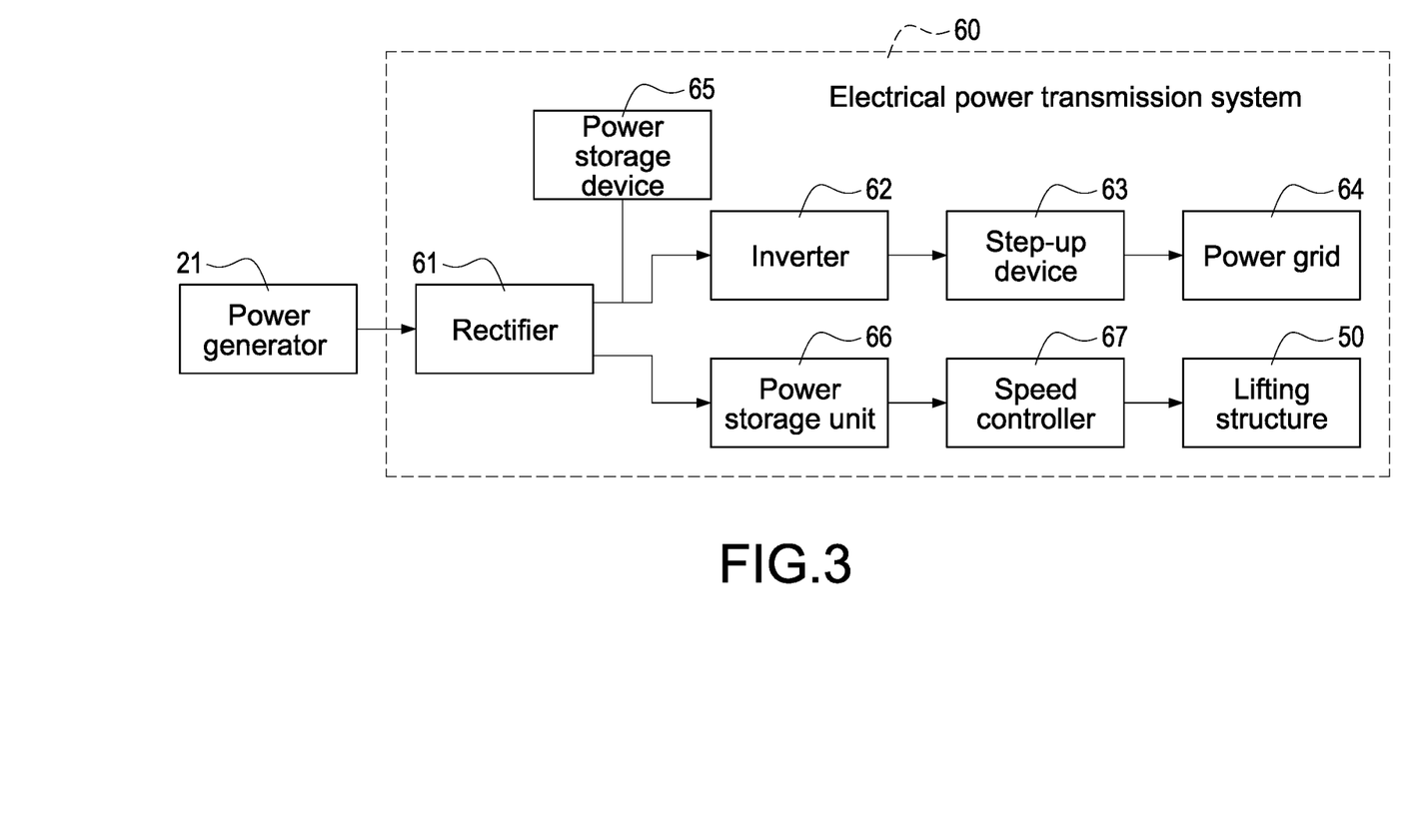
FIG. 3 is a block diagram illustrating an electrical power transmission system of the present disclosure.

Refer to FIG. 3. In one embodiment, the seesaw-type hydroelectric power generation device includes an electrical power transmission system 60. The electricity generated by the power generator 21 of the hydroelectric turbine module 20 is transmitted to the electrical power transmission system 60 through a cable. The current, after passing through the rectifier 61, is divided into two paths: one of the paths sequentially passes through an inverter 62 and then passes through a step-up device 63 to boost the voltage, after which the electricity is fed into a power grid 64. Between the rectifier 61 and the inverter 62, a power storage device 65 may be added for energy storage and voltage stabilization. The other path first passes through an electricity storage unit 66, then a speed controller 67, and is connected to the lifting structure 50. The speed controller 67 adjusts rising and falling speeds of the lifting structure 50, thereby controlling the tilted angle and frequency of the tilt of the elongated container 10, and subsequently the water flow rate and the amount of electricity generated.

Figure 4:
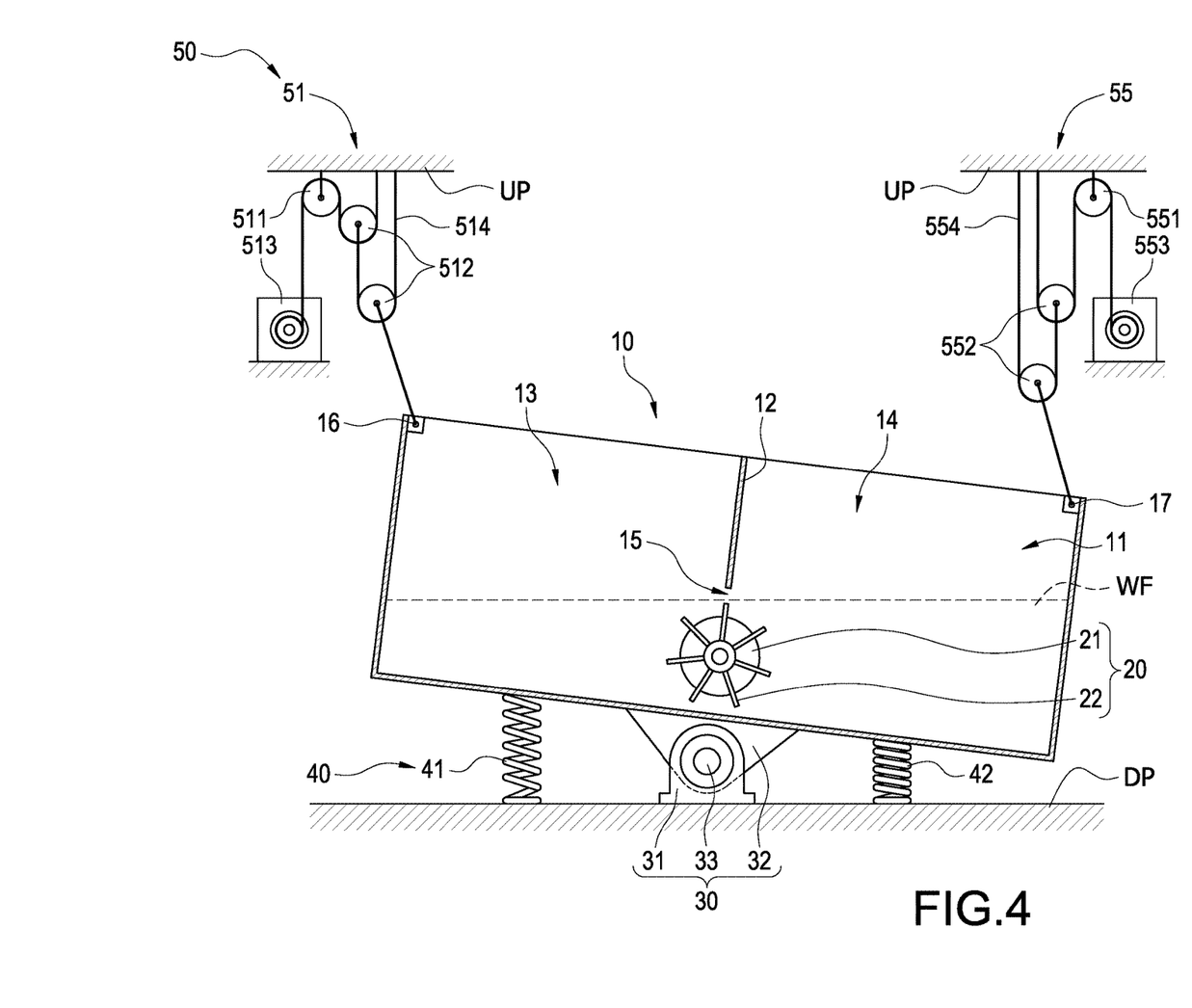
FIG. 4 is a cross-sectional view of an operating state (1) of the seesaw-type hydroelectric power generation device according to the present disclosure.
Figure 5:
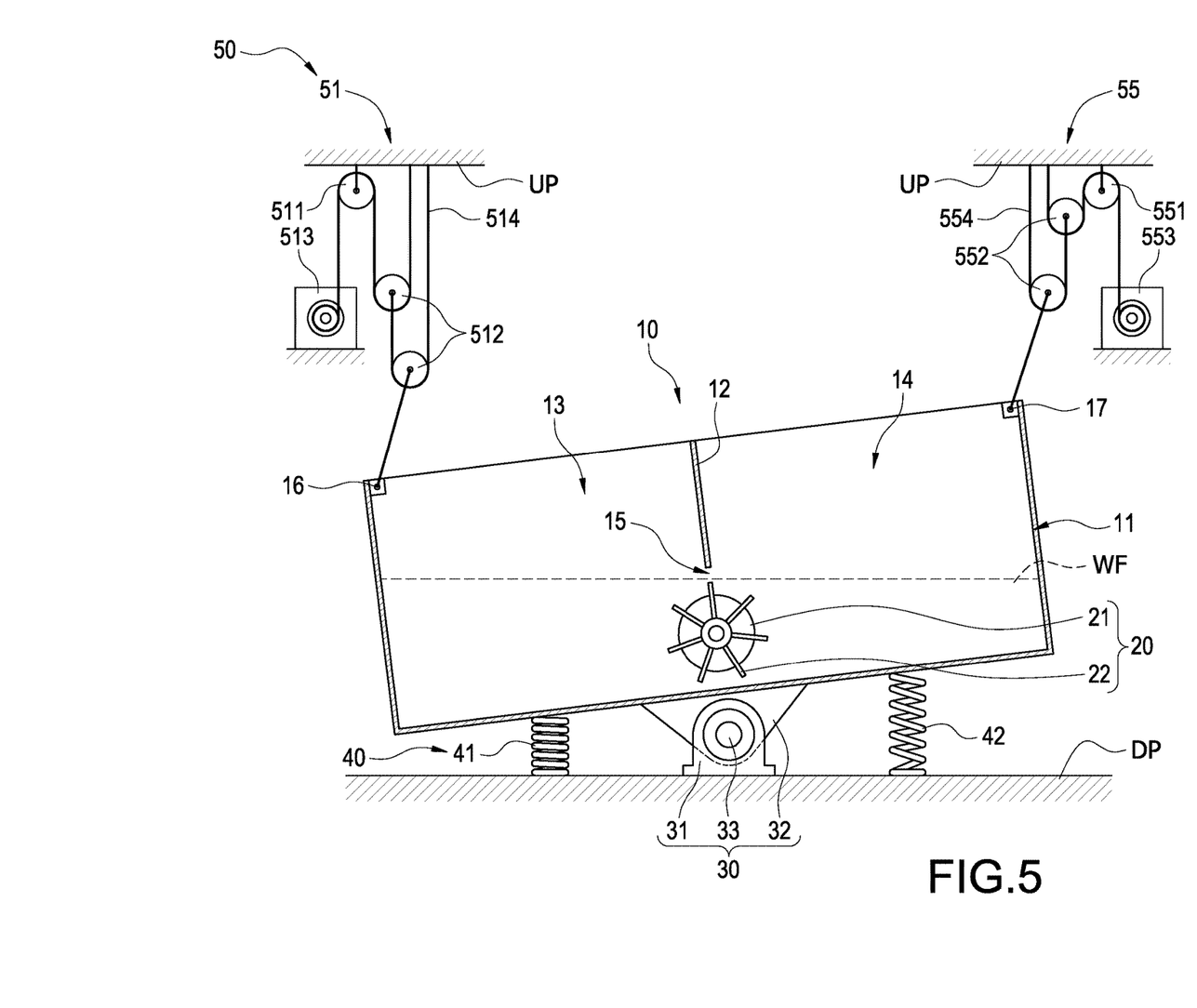
FIG. 5 is a cross-sectional view of an operating state (2) of the seesaw-type hydroelectric power generation device according to the present disclosure.

Please refer to FIGS. 4 and 5. During operation, when the left side of the elongated container 10 is at a highest position and the right side of the elongated container 10 is at a lowest position, the working fluid WF is accumulated in the second containing chamber 14, the second pulley assembly 55 needs to exert an upward force LF2 (see FIG. 2), but actually only needs to exert force LF22, where LF22=¼LF2. Because the force of the spring SF2>SF1, LF2 is relatively small, and the actual exerted force LF22 is even smaller.

When the elongated container 10 is in a horizontal state, the working fluid WF in the first compartment 13 and the working fluid WF in the second compartment 14 are equal, the spring force SF2=SF1, and a relatively small force LF22 may keep the elongated container 10 continuously rotating counterclockwise. When the working fluid WF continues flowing into the first compartment 13, the weight of the working fluid WF in the first compartment 13 is affected by the relatively small force LF22. That is, the relatively small force LF22 may keep the elongated container 10 rotating to the other tilt direction (as shown in FIG. 5). At this point, the left side of the elongated container 10 is at the lowest position, and the right side of the elongated container 10 is at the highest position. At this point, exerted on the left side, the lifting force LF1 (as shown in FIG. 2) causes the elongated container 10 to rotate clockwise to another horizontal state. Subsequently, the elongated container 10 returns to an initial state, thus continuously repeating this seesaw motion.

Figure 6:
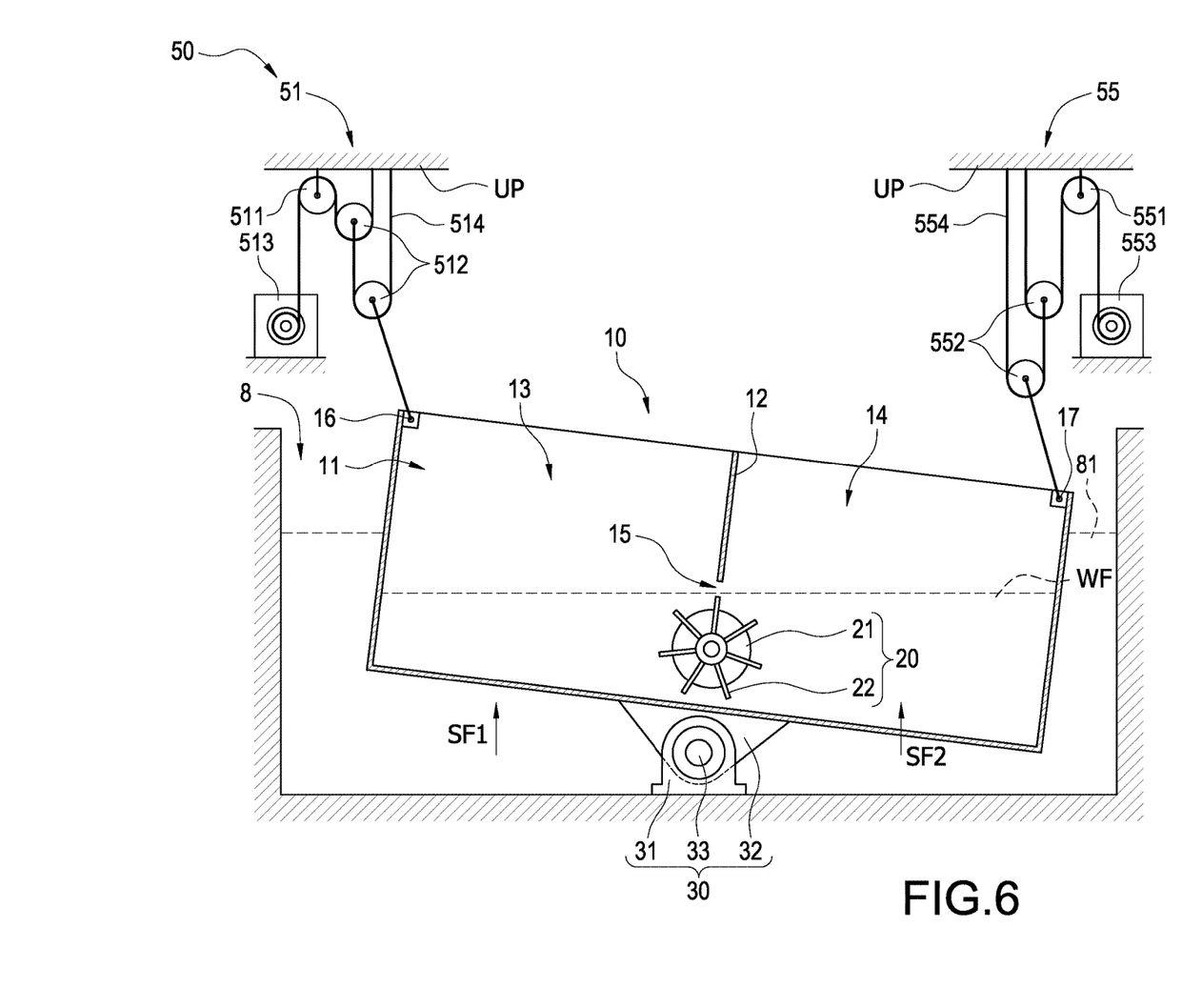
FIG. 6 is a cross-sectional assembly view of another embodiment of the present disclosure.

Please refer to FIG. 6. In addition to the aforementioned embodiment, the seesaw-type hydroelectric power generation device of the present disclosure may also be structured in a manner as in this embodiment. Here, the first pulley assembly 51 and the second pulley assembly 55 of the lifting structure 50 are installed and fixed above a water tank 8. The elongated container 10, the hydroelectric turbine module 20, and the pivot structure 30 are placed inside the water tank 8 which is filled with water 81. As shown in FIG. 6, when the elongated container 10 is in such a state that the second compartment 14 contains the most working fluid WF, having the greatest weight and the largest volume submerged in water 81, the upward buoyancy force SF2 generated by the second compartment 14 is greater than the buoyancy force SF1 generated by the first compartment 13. This buoyancy force (i.e., the jacking structure) effectively replaces the springs 41, 42 of the previous embodiment, operating in the same manner and principle, detailed explanation is omitted for brevity. Furthermore, the aforementioned water tank 8 may also be located in a lake or sea, achieving the same effect.

Figure 7:
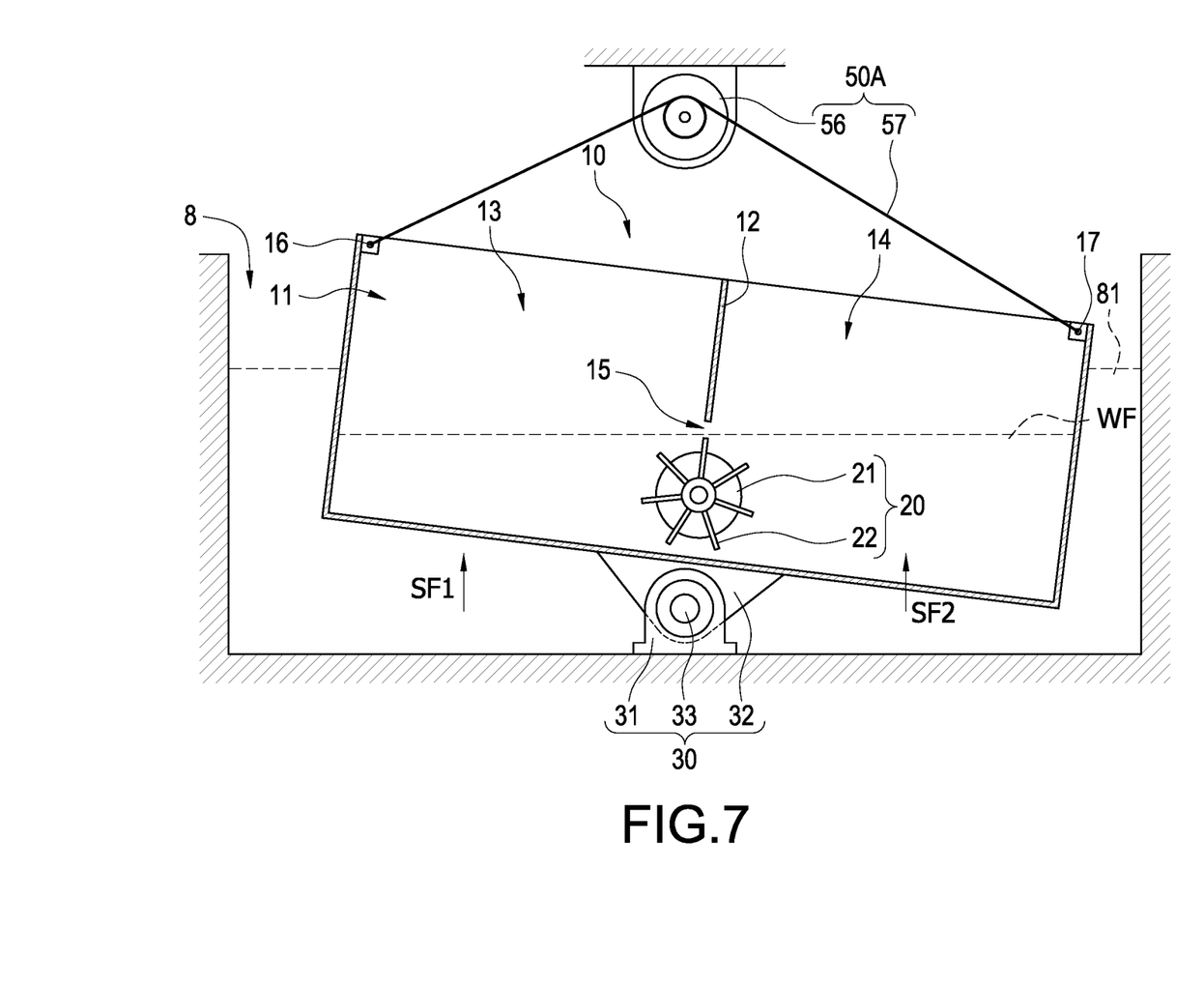
FIG. 7 is a cross-sectional assembly view of yet another embodiment of the present disclosure.

Please refer to FIG. 7. In this embodiment, the lifting structure 50A primarily has an electric motor 56 and a steel cable 57. The electric motor 56 is mounted and fixed above the elongated container 10 and the water tank 8. A middle section of the steel cable 57 is wound around a pulley of the electric motor 56, and two ends of the steel cable 57 are respectively connected to the first compartment tension point 16 and the second compartment tension point 17. This arrangement allows the elongated container 10 to continuously repeat the seesaw motion, driven by the forward and reverse rotations of the electric motor 56.

In summary, the seesaw-type hydroelectric power generation device of the present disclosure can indeed achieve the expected purpose of use and solve the deficiencies of related-art techniques.

What is claimed is:

1. A seesaw-type hydroelectric power generation device, filled with a working fluid (WF) inside, the seesaw-type hydroelectric power generation device comprising:
    an elongated container (10), comprising a chamber (11) filled with the working fluid (WF) and a partition (12), the chamber (11) divided to a first compartment (13) and a second compartment (14) by the partition (12), wherein a water flow passage (15) is located below the partition (12) and communicates with the first compartment (13) and the second compartment (14);
    a lifting structure (50, 50A) arranged above and connected to the elongated container (10);
    a hydroelectric turbine module (20), comprising an impeller (22) and a power generator (21) connected to the impeller (22), wherein the impeller (22) is arranged in the water flow passage (15);
    a pivot structure (30), disposed below the elongated container (10) and arranged corresponding to a middle position of the elongated container (10);
    a jacking structure (40), disposed on two sides of the pivot structure (30);
    wherein when a force is applied to the elongated container (10) through the lifting structure (50, 50A), the elongated container (10) is tilted by pivoting around the pivot structure (30) and alternately jacked through the jacking structure (40), the working fluid (WF) flows reciprocally in the water flow passage (15) and drives the impeller (22) to rotate to generate electricity by the power generator (21).

2. The seesaw-type hydroelectric power generation device as claimed in claim 1, wherein the lifting structure (50A) comprises an electric motor (56) and a steel cable (57), and the elongated container (10) comprises a first compartment tension point (16) and a second compartment tension point (17), the electric motor (56) is fixedly disposed above the elongated container (10), a middle section of the steel cable (57) winds around the electric motor (56), and two ends of the steel cable (57) are respectively connected to the first compartment tension point (16) and the second compartment tension point (17).

3. The seesaw-type hydroelectric power generation device as claimed in claim 1, wherein the jacking structure (40) comprises a water to provide a buoyancy force.

4. The seesaw-type hydroelectric power generation device as claimed in claim 1, wherein the partition (12) is positioned in a middle of the chamber (11) to make a volume of the first compartment (13) be equal to a volume of the second compartment (14).

5. The seesaw-type hydroelectric power generation device as claimed in claim 4, wherein the pivot structure (30) is disposed directly under the partition (12).

6. The seesaw-type hydroelectric power generation device as claimed in claim 1, further comprising an electrical power transmission system (60), wherein electricity generated by the hydroelectric turbine module (20) is transmitted to the electrical power transmission system (60) through a cable.

7. The seesaw-type hydroelectric power generation device as claimed in claim 6, wherein an electrical current is split into two paths after passing through a rectifier (61); one of the paths sequentially passes through an inverter (62) and then passes through a step-up device (63) to boost voltage, and electricity is fed into a power grid (64); another one of the paths passes through an power storage unit (66), then passes through a speed controller (67), and is connected to the lifting structure (50, 50A).

8. The seesaw-type hydroelectric power generation device as claimed in claim 7, further comprising a power storage device (65) disposed between the rectifier (61) and the inverter (62).

9. The seesaw-type hydroelectric power generation device as claimed in claim 1, wherein the lifting structure (50) comprises a first pulley assembly (51) and a second pulley assembly (55), and the first pulley assembly (51) and the second pulley assembly (55) are respectively disposed at corners of the elongated container (10) and disposed corresponding to each other.

10. The seesaw-type hydroelectric power generation device as claimed in claim 9, wherein the second pulley assembly (55) comprises a fixed pulley (551), a plurality of movable pulleys (552), a second electric motor (553), and a pull rope (554), the elongated container (10) comprises a second compartment tension point (17), the fixed pulley (551) is fixed to an upper platform (UP), the second electric motor (553) is connected with the fixed pulley (551) and each of the movable pulley (552) of the second pulley assembly (55) through the pull rope (554) of the second pulley assembly (55), and one of the movable pulleys (552) of the second pulley assembly (55) is connected to the second compartment tension point (17).

11. The seesaw-type hydroelectric power generation device as claimed in claim 9, wherein the first pulley assembly (51) comprises a fixed pulley (511), a plurality of movable pulleys (512), a first electric motor (513), and a pull rope (514), the elongated container (10) comprises a first compartment tension point (16), the fixed pulley (511) is fixed to an upper platform (UP), the first electric motor (513) is connected with the fixed pulley (511) and each of the movable pulleys (512) through the pull rope (514), and one of the movable pulleys (512) is connected to the first compartment tension point (16).

12. The seesaw-type hydroelectric power generation device as claimed in claim 11, wherein the second pulley assembly (55) comprises a fixed pulley (551), a plurality of movable pulleys (552), a second electric motor (553), and a pull rope (554), the elongated container (10) comprises a second compartment tension point (17), the fixed pulley (551) of the second pulley assembly (55) is fixed to an upper platform (UP), the second electric motor (553) is connected with the fixed pulley (551) and each of the movable pulley (552) of the second pulley assembly (55) through the pull rope (554) of the second pulley assembly (55), and one of the movable pulleys (552) of the second pulley assembly (55) is connected to the second compartment tension point (17).

13. A seesaw-type hydroelectric power generation device, filled with a working fluid (WF) inside, the seesaw-type hydroelectric power generation device comprising:
an elongated container (10), comprising a chamber (11) filled with the working fluid (WF) and a partition (12), the chamber (11) divided to a first compartment (13) and a second compartment (14) by the partition (12), wherein a water flow passage (15) is located below the partition (12) and communicates with the first compartment (13) and the second compartment (14);
a hydroelectric turbine module (20), comprising an impeller (22) and a power generator (21) connected to the impeller (22), wherein the impeller (22) is arranged in the water flow passage (15);
a pivot structure (30), disposed below the elongated container (10) and arranged corresponding to a middle position of the elongated container (10);
a jacking structure (40), disposed on two sides of the pivot structure (30);
wherein when a force is applied to the elongated container (10), the elongated container (10) is tilted by pivoting around the pivot structure (30) and alternately jacked through the jacking structure (40), the working fluid (WF) flows reciprocally in the water flow passage (15) and drives the impeller (22) to rotate to generate electricity by the power generator (21);
wherein the jacking structure (40) comprises a pair of springs (41, 42), and the springs (41, 42) are disposed on two sides of the pivot structure (30).

14. A seesaw-type hydroelectric power generation device, filled with a working fluid (WF) inside, the seesaw-type hydroelectric power generation device comprising:
an elongated container (10), comprising a chamber (11) filled with the working fluid (WF) and a partition (12), the chamber (11) divided to a first compartment (13) and a second compartment (14) by the partition (12), wherein a water flow passage (15) is located below the partition (12) and communicates with the first compartment (13) and the second compartment (14);
a hydroelectric turbine module (20), comprising an impeller (22) and a power generator (21) connected to the impeller (22), wherein the impeller (22) is arranged in the water flow passage (15);
a pivot structure (30), disposed below the elongated container (10) and arranged corresponding to a middle position of the elongated container (10);
a jacking structure (40), disposed on two sides of the pivot structure (30);
wherein when a force is applied to the elongated container (10), the elongated container (10) is tilted by pivoting around the pivot structure (30) and alternately jacked through the jacking structure (40), the working fluid (WF) flows reciprocally in the water flow passage (15) and drives the impeller (22) to rotate to generate electricity by the power generator (21);
wherein the partition (12) is positioned in a middle of the chamber (11) to make a volume of the first compartment (13) be equal to a volume of the second compartment (14);
wherein the pivot structure (30) is disposed directly under the partition (12);
wherein the pivot structure (30) comprises a support base (31), an angle plate (32) and a bearing (33), and the support base (31) is fixed to a lower platform (DP), the angle plate (32) is fixed to a bottom surface of the elongated container (10) and connected to the support base (31) through the bearing (33).

\* \* \* \* \*